Patented Feb. 15, 1938

2,108,341

UNITED STATES PATENT OFFICE 2,108,341

SYNTHETIC RESIN

Felix Lauter, Evanston, Ill., assignor to Sealkote Corporation, Chicago, Ill., a corporation of Delaware No Drawing. Application December 7, 1935, Serial No. 53,431

3 Claims. (Cl. 260—4)

This invention relates to synthetic resins of the phenol-formaldehyde type; and the primary object of the invention is to provide a method whereby oxidation is prevented or minimized.

Fusible and soluble synthetic resins today have the characteristics that oxidation takes place rapidly causing discoloration and disintegration on the surface. They have also the characteristics of smell, either of phenol or formaldehyde, depending upon the excess of free phenol or formaldehyde in the finished resin.

I have found that a stable phenolic resin may be obtained when produced in the following manner: 1 mol. of phenol and ¾ of a mol. of formaldehyde are heated in the presence of hydrochloric acid as a catalyzer. During the period of reaction, about 15 minutes after the mass has begun to boil, a hot mixture of ½ mol. of phthalic acid and ½ mol. of glycerine is gradually added to the mass together with 1/180 of a mol. of lactic acid. This causes a new reaction, the lactic acid acting as a catalyzer between the phenol-formaldehyde system and the phthalic acid-glycerine system. During the period of the second reaction, approximately 1 hour, the temperature is maintained at 110° C. After the reaction is completed, dehydration can take place either under a vacuum or in an open vessel with the temperature carried to 230° C. Signs of oxidation appear during cooling. The mass should always be kept under agitation. At 160° C. 1/120 of a mol. of stannous chloride is added, dissolved in alcohol. An immediate checking of the oxidation takes place and is visible, as the discoloration on the surface of the mass, which is evidence of oxidation, disappears. The mass when cooled has a light yellow, brilliant, transparent color and a melting point of 95° C.

The phenol is always used in excess of the amount that will react with the formaldehyde.

The second reaction induced by the phthalic acid, glycerine and lactic acid prevents oxidation until a temperature of about 200° C. is reached. Phenol is used in excess so as to prevent coagulation of the mass which would otherwise take place. The excess of phenol is neutralized by the glycerine. The lactic acid acts as a catalyzer in this reaction. After a temperature of about 200° C. has been reached, some oxidation takes place, as evidenced by reddish color, but is checked by the stannous chloride, and the material given a brilliant transparency.

Other poly-alcohols could be used in place of glycerine except that in most cases these substances would give an undesirable color to the product.

In place of tin chloride it is possible to use zinc chloride or other metallic salt.

I claim:

1. The method of producing a soluble and fusible synthetic resin which comprises heating a mixture of about 1 mol. of phenol and less than 1 mol. of formaldehyde in the presence of hydrochloric acid as a catalyzer; during the reaction adding a heated mixture of about ½ mol. phthalic acid and about ½ mol. of glycerine and about 1/180 mol. of lactic acid as a catalyzer between the two mixtures; dehydrating the mass after reaction between the two mixtures then cooling it and adding a metal halide capable of preventing oxidation during the cooling period.

2. The method of producing a soluble and fusible synthetic resin which comprises reacting phenol and formaldehyde, with the phenol in excess over the equimolecular proportion, and using hydrochloric acid as a catalyzer; during the reaction adding a mixture of glycerine and phthalic acid and using lactic acid as a catalyzer; dehydrating and then cooling the mass and during the cooling adding thereto a metal halide capable of preventing oxidation.

3. A synthetic resin produced by the process of claim 2.

FELIX LAUTER.